March 24, 1964     L. M. HUDSON ETAL     3,126,437
GAUSSIAN PHOTOGRAPHIC OBJECTIVE
Filed Dec. 27, 1960

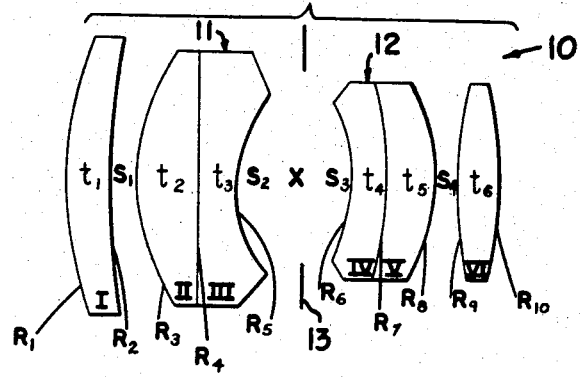

| E.F. = 100 | B.F. = 61.56 | F.A. = 46° | | f/1.8 | |
|---|---|---|---|---|---|
| LENS | RADII | THICKNESSES | SPACINGS | $n_D$ | $\nu$ |
| I | $R_1$ = 75.20 | $t_1$ = 9.00 | $S_1$ = 4.03 | 1.720 | 47.5 |
| | $R_2$ = 271.65 | | | | |
| II | $R_3$ = 42.71 | $t_2$ = 10.59 | $S_2$ = 11.01 | 1.720 | 42.0 |
| | $R_4$ = ∞ | | | | |
| III | $R_5$ = 27.56 | $t_3$ = 7.91 | | 1.720 | 29.3 |
| IV | $R_6$ = −28.72 | $t_4$ = 7.00 | $S_3$ = 11.01 | 1.605 | 38.0 |
| | $R_7$ = −1023.62 | | | | |
| V | $R_8$ = −39.66 | $t_5$ = 8.97 | | 1.657 | 57.2 |
| VI | $R_9$ = 220.67 | $t_6$ = 7.97 | $S_4$ = 0.10 | 1.691 | 54.8 |
| | $R_{10}$ = −93.18 | | | | |

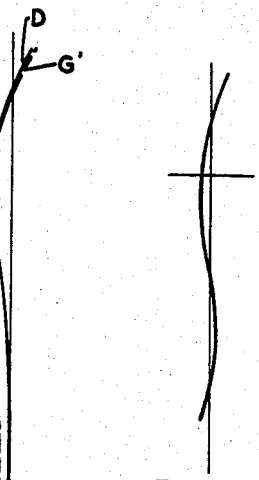

FIG. 3

| E.F. = 100 | B.F. = 63.38 | F.A. = 45° | | f/1.8 | |
|---|---|---|---|---|---|
| LENS | RADII | THICKNESSES | SPACINGS | $n_D$ | $\nu$ |
| I | $R_1$ = 75.46 | $t_1$ = 9.01 | $S_1$ = 0.10 | 1.744 | 45.6 |
| | $R_2$ = 273.87 | | | | |
| II | $R_3$ = 42.52 | $t_2$ = 16.55 | $S_2$ = 9.76 | 1.720 | 42.0 |
| | $R_4$ = ∞ | | | | |
| III | $R_5$ = 28.19 | $t_3$ = 2.00 | | 1.720 | 29.3 |
| IV | $R_6$ = −32.90 | $t_4$ = 7.01 | $S_3$ = 8.25 | 1.689 | 30.9 |
| | $R_7$ = ∞ | | | | |
| V | $R_8$ = −45.22 | $t_5$ = 9.02 | | 1.744 | 45.6 |
| VI | $R_9$ = 250.96 | $t_6$ = 8.02 | $S_4$ = 0.10 | 1.720 | 47.5 |
| | $R_{10}$ = −109.45 | | | | |

INVENTORS
LENA M. HUDSON
JOHN M. SCHWARTZ
BY Frank C. Parker
ATTORNEY

United States Patent Office 3,126,437
Patented Mar. 24, 1964

3,126,437
GAUSSIAN PHOTOGRAPHIC OBJECTIVE
Lena M. Hudson, Brighton, and John M. Schwartz, Irondequoit, N.Y., assignors to Bausch & Lomb Incorporated, Rochester, N.Y., a corporation of New York
Filed Dec. 27, 1960, Ser. No. 78,594
2 Claims. (Cl. 88—57)

The present invention relates generally to a photographic objective for use in taking or projecting pictures or similar use, and relates more particularly to improvements in a so-called Gauss type of objective.

A prime objective of this invention is to provide a novel and improved Gauss type of photographic objective of at least $f/1.8$ relative aperture and at least $45°$ field angle wherein the chromatic and spherical aberrations, coma and astigmatism are particularly well corrected, and wherein zero distortion has been achieved together with an excellent flat field. It is a further object of this invention to provide such a device having a relatively long back focus of at least .61F where F denotes the equivalent focus of the objective and the use of low curvatures in the lens surfaces thereof resulting in a lower cost of manufacture.

Further objects and advantages will be apparent in the arrangement of parts and details of construction by reference to the specification herebelow taken together with the drawing wherein:

FIG. 1 is an optical diagram showing an optical system of the above-mentioned kind;

FIG. 2 is a chart of constructional data related to one form of the present invention;

FIG. 3 is a chart of constructional data related to a second form of the present invention; and FIGS. 4, 5 and 6 are graphs which are plotted to show the excellent condition of spherical aberration, coma and astigmatism respectively, found in said optical system.

The present invention is exemplified in a Gauss type of photographic objective which is indicated generally by numeral 10 in FIG. 1, said objective having a long back focus designated by BF, of at least .61F where F designates the equivalent focus of the objective 10 and having a relative aperture as large as $f/1.8$.

According to this invention, distinct improvements in the spherical and chromatic aberrations of the objective 10 are provided together with an excellent condition of coma, astigmatism and zero distortion. Additionally, a superior flat field is achieved over a total field angle of at least $45°$. These advantageous features are obtained along with relatively flat lens surface curvatures which permit reduction in manufacturing costs, and particularly, these features are obtained by use of the most beneficial relationship for refractive index and Abbe number amongst the lens elements in said objective.

Said objective comprises two convex-concavo meniscus lens members 11 and 12 spaced from the front and the rear sides respectively, of an interposed diaphragm 13 in optical alignment with each other, said lens members being concave toward the diaphragm. Optically aligned therewith and spaced forwardly thereof is a collective singlet lens member I, and rearwardly spaced from member 12 is a collective single lens VI which together form a compact objective having a relatively short overall length of not greater than .8F and having a long back focus of at least .61F where F denotes the equivalent focus of said objective 10.

Lens member 11 is composed of a positive plano convex lens element II and a negative plano concave element III which is preferably cemented thereto to form a plano interface $R_4$, the curve refractive surfaces $R_3$ and $R_5$ thereof being concave toward the diaphragm 13.

Lens member 12 is composed of a positive meniscus lens element V located rearwardly of and preferably in cemented contact with a negative meniscus lens element IV along an interface $R_7$ therebetween.

In this invention, the refractive index of the glasses in the various lens elements I to VI is generally high and the various chosen values of $n_D$ and $\nu$ are so distributed and sequentially arranged as to achieve a particularly fine correction for astigmatism as well as coma, spherical and chromatic aberrations and distortion as well as field flatness.

In FIG. 4 is shown the excellent condition of spherical aberration for the D line of the spectrum which is shown as a solid line and for the G′ line of the spectrum which is shown as a dotted line.

In FIG. 6 the sagittal astigmatism is designated by S and the tangential astigmatism is designated by T.

The most favorable range of $n_D$ and $\nu$ values for obtaining the aforesaid optical properties is given in Table I herebelow.

Table 1

$$n_D \begin{cases} \text{Elem. I} \\ \text{Elem. II} \\ \text{Elem. III} \end{cases} > 1.719$$

$n_D$ (Elem. II) $= n_D$ (Elem. III)

$$\frac{n_D = (\text{Elem. IV})}{n_D = (\text{Elem. V})} = .96 \text{ substantially}$$

$$.92 < \frac{n_D(\text{ Elem. IV})}{n_D(\text{ Elem. I})} < .97$$

$$.97 < \frac{n_D(\text{ Elem. VI})}{n_D(\text{ Elem. I})} < .99$$

$3.1 < \nu(\text{Elem. I}) - \nu(\text{Elem. II}) < 6.0$
$12.0 < \nu(\text{Elem. II}) - \nu(\text{Elem. III}) < 13.5$
$9.0 < \nu(\text{Elem. IV}) - \nu(\text{Elem. IV}) < 16.0$
$1.5 < \nu(\text{Elem. V}) - \nu(\text{Elem. I}) < 10.2$
$1.4 < \nu(\text{Elem. VI}) - \nu(\text{Elem. I}) < 7.8$ Other constructional data appropriate to the attainment of the objects of this invention, assuming that the above-mentioned values of $n_D$ and $\nu$ are adopted, are given in the various statements of inequalities of Table II herebelow wherein $R_1$ to $R_{10}$ denote the radii of the lens surfaces, $t_1$ to $t_6$ denote the axial thicknesses of the lens elements in order numbering from the front of the objective, $S_1$ to $S_4$ denote the axial air spaces between the respective lens members 1, 11, 12, and VI.

Table II

$.74F < R_1 < .80F$
$2.5F < R_2 < 3.00F$
$.41 < R_3 < .46F$
$R_4 > \pm 2.5F$
$.26F < R_5 < .30F$
$.17F < -R_6 < .34F$
$R_7 > \pm 9.0F$
$.37F < -R_8 < .48F$
$2.0F < R_9 < 2.7F$
$.9F < -R_{10} < 1.2F$
$.08F < t_1 < .10F$
$.10F < t_2 < .17F$
$.020F < t_3 < .080F$
$.065F < t_4 < .080F$
$.070F < t_5 < .10F$
$.075F < t_6 < .095F$
$.0005F < S_1 < .046F$
$.09F < S_2 < .12F$
$.07F < S_3 < .12F$
$.0009F < S_4 < .0015F$

A series of photographic objectives of a distinctive form following the teachings of this invention have been constructed using the restricted ranges of constructional data given herebelow in Table III, the notation used therein being the same as found in Tables I and II.

Table III $.75F < R_1 < .80F$
$2.60F < R_2 < 3.00F$
$.42F < R_3 < .46F$
$R_4 = \infty$
$.27F < R_5 < .30F$
$.28F < -R_6 < .31F$
$10.0F < -R_7 < 20.0F$
$.38F < -R_8 < .43F$
$2.15F < R_9 < 2.40F$
$.90F < -R_{10} < 1.0F$
$.09F < t_1 < .10F$
$.10F < t_2 < .13F$
$.065F < t_3 < .085F$
$.065F < t_4 < .080F$
$.070F < t_5 < .10F$
$.075F < t_6 < .095F$
$.036F < S_1 < .046F$
$.10F < S_2 < .12F$
$.10F < S_3 < .12F$
$.008F < S_4 < .015F$
$1.719 < n_D$ (Elem. I) $= n_D$ (Elem. II)
$= n_D$ (Elem. III) $< 1.751$
$n_D$ (Elem. III) $- n_D$ (Elem. IV) = substantially .118
$n_D$ (Elem. III) $- n_D$ (Elem. V) = substantially .046
$n_D$ (Elem. III) $- n_D$ (Elem. VI) = substantially .032
$\nu$(Elem. I) $- \nu$(Elem. II) = substantially 6.1
$\nu$(Elem. I) $- \nu$(Elem. III) = substantially 18.7
$\nu$(Elem. V) $- \nu$(Elem. VI) = substantially 2.9
$\nu$(Elem. V) $- \nu$(Elem. IV) = substantially 20.3
$\nu$(Elem. V) $- \nu$(Elem. I) = substantially 10.5

One successful form of the aforesaid series is described in detail with respect to its constructional properties which appear in Table IV herebelow and also appear in FIG. 2 of the drawing wherein the notations I to VI denote the individual lens elements, $R_1$ to $R_{10}$ denote the radii of the refractive surfaces, $t_1$ to $t_6$ denote the axial thicknesses of the lenses, $S_1$ to $S_4$ denote the axial air spaces between the lens members, $n_D$ denotes the refractive index, and $\nu$ represents the Abbe number of the glass used in the respective lens elements, and FA denotes the field angle.

Table IV

[E.F. = 100. B.F. = 61.56. F.A. = 45°. f/1.8]

| Lens | Radii | Thicknesses | Spacings | $n_D$ | $\nu$ |
|---|---|---|---|---|---|
| I | $R_1 = 75.20$ | $t_1 = 9.00$ | | 1.720 | 47.5 |
| | $R_2 = 271.65$ | | $S_1 = 4.03$ | | |
| II | $R_3 = 42.71$ | $t_2 = 10.59$ | | 1.720 | 42.0 |
| III | $R_4 = \infty$ | $t_3 = 7.91$ | | 1.720 | 29.3 |
| | $R_5 = 27.56$ | | $S_2 = 11.01$ $S_3 = 11.01$ | | |
| IV | $R_6 = -28.72$ | $t_4 = 7.00$ | | 1.605 | 38.0 |
| V | $R_7 = -1,023.62$ | $t_5 = 8.97$ | | 1.657 | 57.2 |
| | $R_8 = -39.66$ | | $S_4 = 0.10$ | | |
| VI | $R_9 = 220.67$ | $t_6 = 7.97$ | | 1.691 | 54.8 |
| | $R_{10} = -93.18$ | | | | |

The specific constructional data for a second form of the invention is given in Table V herebelow and is shown in FIG. 3 of the drawing, wherein the various notations have the same meaning as in the foregoing tables.

Table V

[E.F. = 100. B.F. = 63.38. F.A. = 45°. f/1.8]

| Lens | Radii | Thicknesses | Spacings | $n_D$ | $\nu$ |
|---|---|---|---|---|---|
| I | $R_1 = 75.46$ | $t_1 = 9.01$ | | 1.744 | 45.5 |
| | $R_2 = 273.87$ | | $S_1 = 0.10$ | | |
| II | $R_3 = 42.52$ | $t_2 = 16.55$ | | 1.720 | 42.0 |
| III | $R_4 = \infty$ | $t_3 = 2.00$ | | 1.720 | 29.3 |
| | $R_5 = 28.19$ | | $S_2 = 9.76$ $S_3 = 8.25$ | | |
| IV | $R_6 = -32.90$ | $t_4 = 7.01$ | | 1.689 | 30.9 |
| V | $R_7 = \infty$ | $t_5 = 9.02$ | | 1.744 | 45.6 |
| | $R_8 = -45.22$ | | $S_4 = 0.10$ | | |
| VI | $R_9 = 250.96$ | $t_6 = 8.02$ | | 1.720 | 47.5 |
| | $R_{10} = -109.45$ | | | | |

It will be understood that although only two forms of this invention have been shown and described in detail, other forms are possible and changes may be made in the details thereof without departing from the spirit of the invention as defined in the claims herebelow.

What is claimed is:

1. A Gauss type of photographic objective which is well corrected for spherical and chromatic aberrations, astigmatism, coma, flatness of field and distortion and having a long back focus of substantially .62F where F denotes the focal length of said objectives, a field angle of at least 45°, and a short overall length of less than .8F, said objective comprising two negative meniscus lens members which are located in optical alignment and in spaced relation to each other and between two outer collective single lens members, said meniscus members being concave towards an interposed diaphragm and each said meniscus member being composed of a negative and a positive lens element with the negative elements being closest to each other, the constructional data for said objective being given in the statements of inequalities herebelow wherein $R_1$ to $R_{10}$ denote the radii of the lens surfaces, $t_1$ to $t_6$ denote the axial thicknesses of the successive lens elements numbering from the front of the objective, $S_1$ to $S_4$ denote the axial air spaces between the lens members, $n_D$ denotes the refractive index, and $\nu$ denotes the Abbe number of the glass from which the various lens elements are made, 2. A Gauss type of photographic objective which is well corrected for spherical and chromatic aberrations, astigmatism, coma, flatness of field and distortion and having a long back focus of substantially .62F where F denotes the focal length of said objective, a field angle of at least 45°, and a short overall length of less than .8F, said objective comprising two negative meniscus lens members which are located in optical alignment and in spaced relation to each other and between two outer collective single lens members, said meniscus members being concave toward an interposed diaphragm and each said meniscus member being composed of a negative and a positive lens element with the negative elements being closest to each other, the constructional data for said objective being given in the statements of inequalities herebelow wherein $R_1$ to $R_{10}$ denote the radii of the lens surfaces, $t_1$ to $t_6$ denote the axial thicknesses of the successive lens elements numbering from the front of the objective, $S_1$ to $S_4$ denote the axial air spaces between the lens members, $n_D$ denotes the refractive index, and $\nu$ denotes the Abbe number of the glass from which the various lens elements are made,

[E.F.=100. B.F.=63.38. F.A.=45°. f/1.8]

| Lens | Radii | Thicknesses | Spacings | $n_D$ | $\nu$ |
|---|---|---|---|---|---|
| I | $R_1=75.46$ | $t_1=9.01$ | | 1.744 | 45.5 |
| | $R_2=273.87$ | | $S_1=0.10$ | | |
| II | $R_3=42.52$ | $t_2=16.55$ | | 1.720 | 42.0 |
| | $R_4=\infty$ | | | | |
| III | $R_5=28.19$ | $t_3=2.00$ | | 1.720 | 29.3 |
| | | | $S_2=9.76$ | | |
| | | | $S_3=8.25$ | | |
| IV | $R_6=-32.90$ | $t_4=7.01$ | | 1.689 | 30.9 |
| | $R_7=\infty$ | | | | |
| V | $R_8=-45.22$ | $t_5=9.02$ | | 1.744 | 45.6 |
| | | | $S_4=0.10$ | | |
| VI | $R_9=250.96$ | $t_6=8.02$ | | 1.720 | 47.5 |
| | $R_{10}=-109.45$ | | | | |

References Cited in the file of this patent

UNITED STATES PATENTS

| 2,735,340 | Aklin | Feb. 21, 1956 |
| 2,784,643 | Brendel et al. | Mar. 12, 1957 |

FOREIGN PATENTS

| 210,640 | Austria | Aug. 10, 1960 |

UNITED STATES PATENT OFFICE
CERTIFICATE OF CORRECTION

Patent No. 3,126,437                      March 24, 1964

Lena M. Hudson et al.

It is hereby certified that error appears in the above numbered patent requiring correction and that the said Letters Patent should read as corrected below.

Column 1, line 71, for "curve" read -- curved --; column 4, line 37, for "objectives" read -- objective --; line 42, for "single" read -- singlet --; line 43, for "towards" read -- toward --; column 5, line 10, for "single" read -- singlet --; column 6, in the table, under the heading "v", line 1, thereof, for "45.5" read -- 45.6 --.

Signed and sealed this 21st day of July 1964.

(SEAL)

Attest:

ESTON G. JOHNSON
Attesting Officer

EDWARD J. BRENNER
Commissioner of Patents